UNITED STATES PATENT OFFICE.

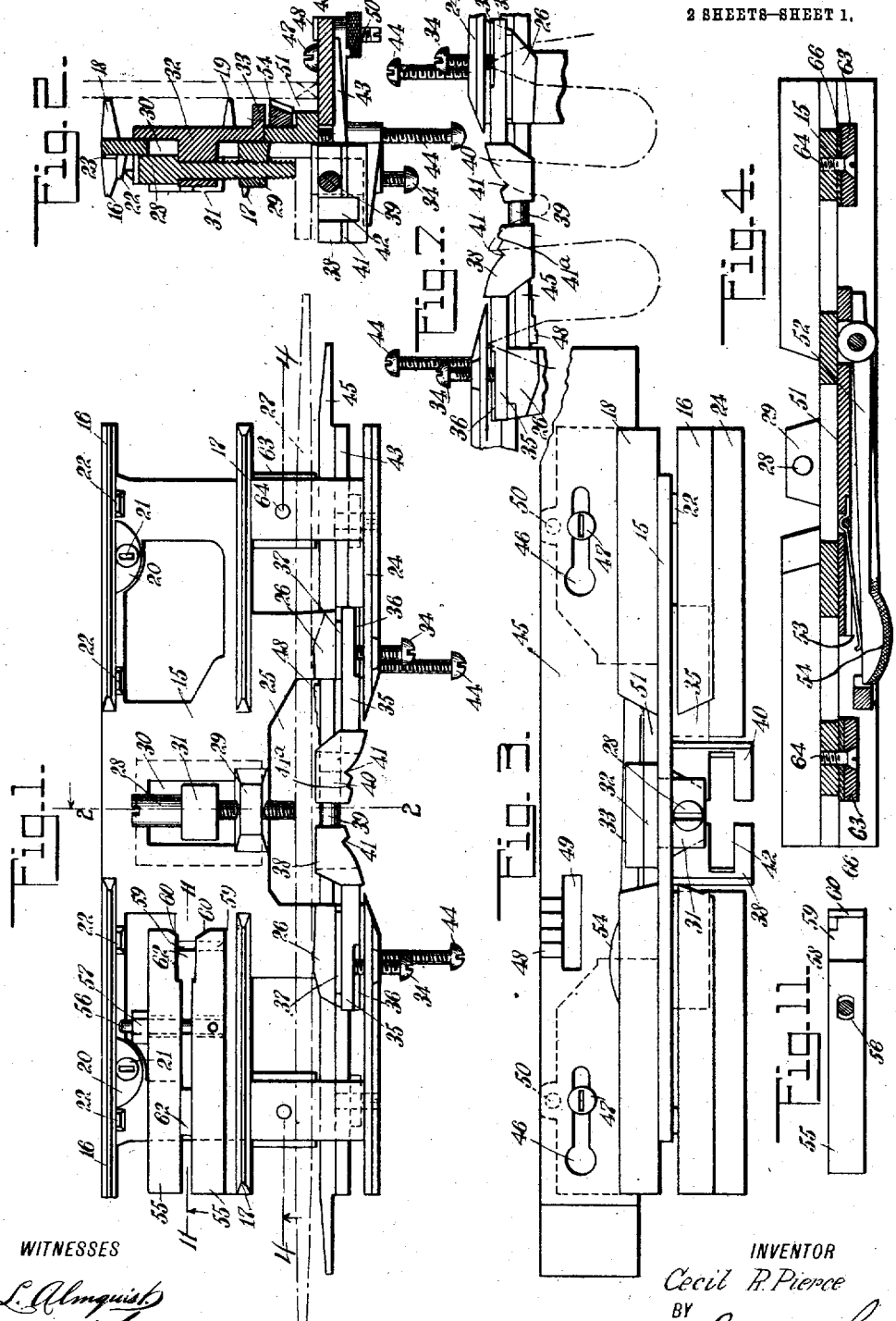

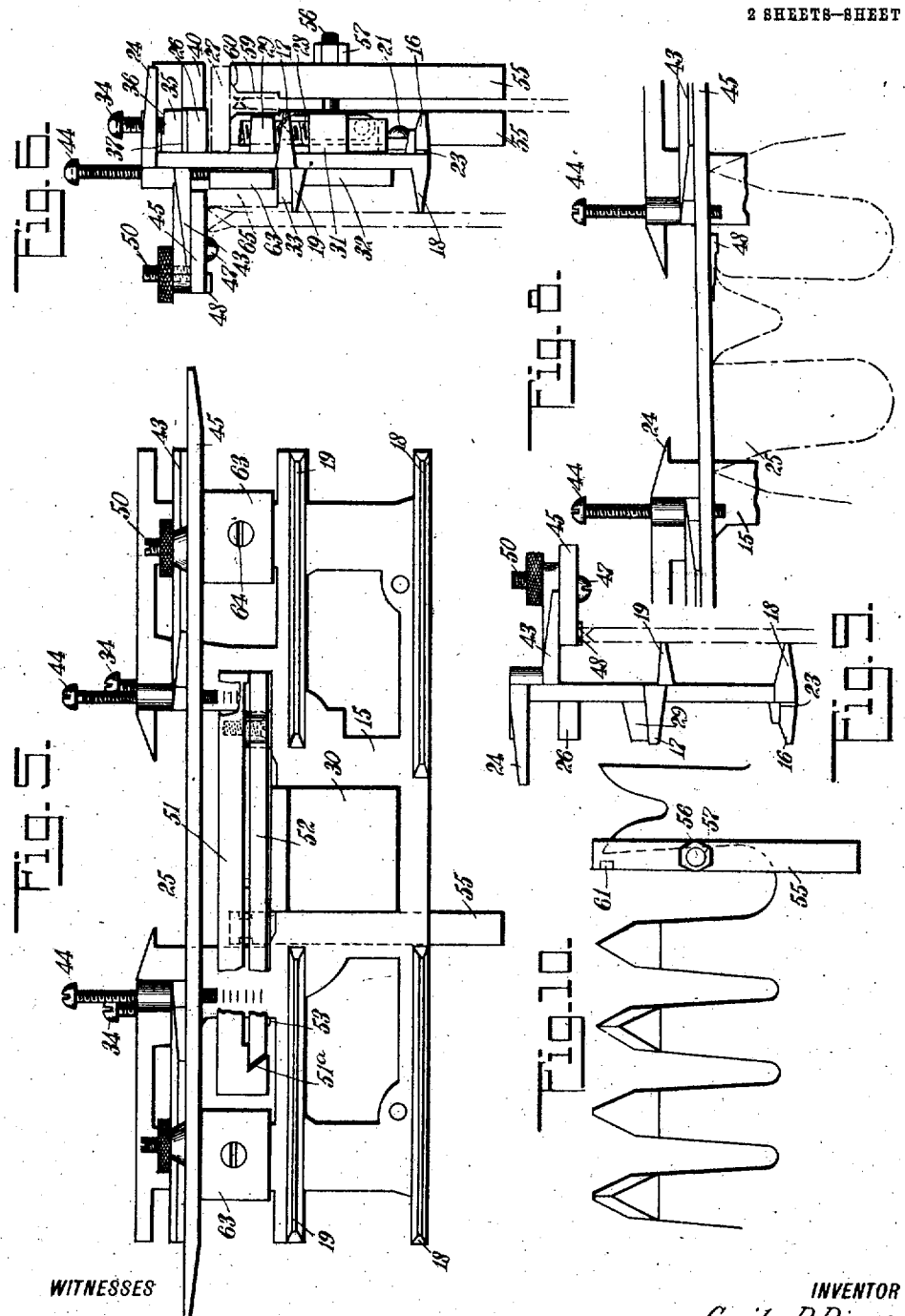

CECIL R. PIERCE, OF RAINIER, WASHINGTON.

SAW-FITTING DEVICE.

972,789.   Specification of Letters Patent.   Patented Oct. 11, 1910.

Application filed December 10, 1909. Serial No. 532,332.

*To all whom it may concern:*

Be it known that I, CECIL R. PIERCE, a citizen of the United States, and a resident of Rainier, in the county of Thurston and State of Washington, have invented a new and Improved Saw-Fitting Device, of which the following is a full, clear, and exact description.

The invention is an improvement in fitting tools for cross-cut saws, and has in view an implement having instrumentalities for accurately fitting or placing in working order both the cutting and raker teeth of the saw, the same comprising, with reference to the cutting teeth, a jointer serving to file off the points of the teeth on a regular line, a side dresser for the teeth, and a scriber for drawing the pitched lines at the opposite sides of the teeth, whereby they may be filed to a uniform bevel; and comprising, with reference to the raker teeth, a pointer to enable them to be filed on the required curve or angle to a uniform length, and a gage to indicate when the teeth have been properly swaged.

Reference is to be had to the accompanying drawings forming a part of this specification, in which similar characters of reference indicate corresponding parts in all the views.

Figure 1 is a side view of the tool in an inverted position, showing the file for jointing the cutting teeth in dotted outline; Fig. 2 is a vertical section of the tool on the line 2—2 of Fig. 1; Fig. 3 is a plan of the tool as shown in Fig. 1; Fig. 4 is a longitudinal section of the tool on the line 4—4 of Fig. 1, looking in the direction of the arrow; Fig. 5 is a side view of the tool looking at the opposite side from that shown in Fig. 1, with the tool in an upright position, the raker pointer being omitted. Fig. 6 is an end view of the tool as shown in Fig. 5, with the scriber removed, the figure showing the side dressing file and the saw in dotted outline at one side of the tool and the jointing file and saw in dotted outline at the opposite side of the tool, with the file-adjusting gage in position to determine the proper angle of the file; Fig. 7 is a fragmentary view of the tool, showing the saw in dotted outline as positioned for pointing the raker teeth; Fig. 8 is a similar view, looking at the opposite side of the tool, with the saw shown in dotted position as when determining the swage of the raker teeth; Fig. 9 is a view looking at the opposite end of the tool from that shown in Fig. 6, with the frame of the tool stripped of all attachments except the combined gage and guide bar, and the saw shown in dotted outline; Fig. 10 is a side view of the saw, with the adjusting gage for the jointing file as shown in Fig. 6, applied to one of the raker teeth; and Fig. 11 is a section of the file-adjusting gage on the line 11—11 of Fig. 1.

The frame proper of the tool is in the nature of a flat plate 15 having parallel guide flanges 16 and 17 longitudinally extending at one side of and at the bottom and midway of the plate, similar guide flanges 18 and 19 likewise extending at the opposite side of the plate or frame, with the guide flange 18 arranged opposite to the guide flange 16, and the guide flange 19 arranged substantially opposite or slightly below the guide flange 17, with all of the guide flanges cut away at the center, as clearly shown in Figs. 1 and 5, forming each flange into two sections. Each section of the guide flange 16 is provided with an ear or extending portion 20, through which it is secured to the frame by a screw 21, the section of the guide flange when in parallelism with the other guide flanges, seating or bearing against lugs 22 rigid with the plate 15, this manner of detachably applying the sections of the guide flange 16 adapting them to be adjusted outwardly from the plate by inserting packing or liners 23 between them and the plate, as shown in Figs. 2 and 6. At the top of the plate 15 and at the same side as the guide flanges 16 and 17, is an outwardly-projecting gage flange 24, likewise made in two sections, between which the plate 15 is cut out for a substantial depth, forming the opening 25. At each side of this opening and underneath and spaced from the gage flange 24 are lugs 26, the under faces of which incline inwardly and upwardly, as shown in Fig. 1, and form a seat for a jointing file 27, as shown in dotted outline, the file being clamped to place centrally between the lugs 26 by a vertical screw 28 threaded through a lug 29 rigid with the plate at the upper end of an opening 30, the head of the screw bearing against and supported from this side of the plate, as shown in Fig. 3, and the body of the screw between its head and the lug 29 passing through a projection 31 rigid with a clamping plate 32 slidable against the opposite face of the frame or plate 15, the projection 31 being slidable on the screw, and the clamping-plate having an outwardly-projecting flange or foot 33 at its upper edge.

Directly above the lugs 26 each section of the gage flange 24 is provided with a set-screw 34 adapted to bear on shanks 35 of a sectional pointer gage for filing the raker teeth of the saw to a uniform length and pitch. The set-screws 34 engage in longitudinal slots 36 of the shanks 35 and clamp the latter to the lugs 26, adapting the gage to be raised or lowered by the insertion of liners 37 between the shanks 35 and lugs 26, of different thicknesses, the slots 36 serving to prevent the pointer gage from slipping out when the set-screws 34 are loosened. One section 38 of the pointer gage is provided with a stem 39 slidable within an opening formed in the opposed end of the other section 40 of the gage, both sections 38 and 40 having grooves 41, the outer sides of which are curved and the inner sides beveled flat, to conform to either curved or straight pitched raker teeth, the section 40 having a groove 41$^a$ arranged inwardly of the groove 41, and provided with flat beveled sides, the groove 41$^a$ being used when the latter kind of raker teeth are filed. The adjustment between the two sections of the gage adapts the gage to teeth of different spread. A vertical slot 42 is formed in the pointer gage, as shown in Fig. 3, to receive the raker teeth of the saw, as shown in Fig. 7, the cutting teeth, as shown in this figure, when the saw is thus disposed, bearing on the under side of the gage flange 24.

Slightly below the gage flange 24 and at the opposite side of the plate or frame 15, is a supporting flange 43 parallel to the guide flanges 18 and 19 and likewise made in two sections, the flange sections having adjacent to the plate 15, binding or set-screws 44, and removably carrying a combined gage and guide bar 45, the connection between the guide-bar and flange 43 being effected by providing the guide-bar with key-hole slots 46, through which pass screws 47, threaded into the flange sections, this manner of supporting the guide-bar permitting of the latter being removed and reversed to carry a stepped gage 48 adjacent to or away from the plate 15. Adjacent to the gage 48 the combined gage and guide-bar is provided with a slot or opening 49 to allow the light to pass therethrough when determining the swage of the cutting teeth, as illustrated in Fig. 3. The combined gage and guide-bar 45 may be laterally tilted by set-screws 50 bearing thereon and threaded through the flange sections 43.

A bar 51, shown in Fig. 2 to be approximately L-shaped in cross-section, or provided with an outwardly-extending foot at its upper edge, forms the frame or carrier for a scriber 52, the latter being in the nature of an arm pivotally supported at one end and having a limited outward movement, to which it is normally forced by a spring 53, the latter being arranged between the bar and the scriber-arm, as best shown in Fig. 4, with the free end of the arm or scriber point being bulged and having a filing edge 54. This end of the scriber-arm is prevented from being accidentally depressed by the under-cut or beveled end of the bar 51, as indicated at 51$^a$, and correspondingly forming the end of the arm; see Fig. 5.

A gage for adjusting the jointing file 27, as shown in Figs. 1, 5, 6 and 10, is composed of two clamping-bars 55, 55, forced together by the clamping-screw 56 and clamping-nut 57, the screw passing through a slot 58 in the bars, as shown in Fig. 11, and its head being slightly flattened at the sides to prevent it from turning when the nut is tightened. As best shown in Figs. 1 and 11, the outer ends of the clamping-bars are rabbeted or cut out, as indicated at 59, with the outer edges outwardly beveled as indicated at 60, one bar having at the side a guide 61 movable through a slot in the side of the other bar. When the gage for adjusting the jointing file is not in use it is clamped to outwardly-projecting lugs 62 rigid with the plate or frame 15 and arranged between the guide flanges 16 and 17, as best shown in Fig. 1. As best shown in Figs. 5 and 6, blocks 63 are secured by screws 64 to the frame 15 between the flanges 43 and 19 immediately adjacent to the combined guide and gage bar 45, the blocks serving to support the inner side of a file 65, shown in dotted outline in Fig. 6, for side dressing the raker teeth of the saw, the file being clamped in position against the under side of the combined guide and gage bar by the foot 33 of the clamping plate 32, and is adjusted outwardly from the frame 15 by placing liners or packing 66 between the frame and the blocks 63.

In the fitting of a cross-cut saw by the tool, the jointing file 27 is clamped to the under side of the lugs 26 by the screw 28, the relative tightness of this screw against the file obviously controlling the relative curvature of the file. With the file properly clamped, the points of the cutting teeth are filed off on a regular line by placing the guide flanges 16 and 17 against the side of the saw and moving the tool back and forth. A side dressing file is then clamped to the plate 45 by the clamping-plate 32, as shown in Fig. 6, and the tool likewise operated with the flanges 18 and 19 against the side of the saw in uniformly side-dressing the cutting teeth. The side dressing file 65 is then removed and the scriber clamped in place between the screws 44 and the clamping plate 32, as shown in Fig. 2, the filing edge of the scriber being adjusted to the requisite distance from the combined guide and gage bar 45 to give the cutting teeth the proper bevel or pitch. A line is then drawn on the side of the cutting teeth, as shown in Fig. 10, at each side of the saw. The cutting teeth may then be accurately filed, as shown in Fig. 10. In the jointing of the cutting teeth, the adjustment of the jointing file to give the teeth the desired pitch is determined by the gage, as shown in Figs. 1, 5, 6 and 10. This gage is clamped to one of the raker teeth, with the ends of the clamping-bars projecting slightly above the point of the tooth, as shown in Fig. 10. The tool is then placed against the gage in the manner illustrated in Figs. 4, 5 and 6, after which the flange 16 is adjusted until it touches the outer edges of the clamping-bars, by altering the packing 23 so that the points of the clamping-bars at the outer edges will both bear on the under face of the file.

In pointing the raker teeth they are passed in succession through the slot 42 of the pointing gage, this slot being sufficiently wide to receive saws of varying thicknesses, the gage flange 24 bearing on the points of the cutting teeth, as shown in Fig. 7. The sections of the pointing gage are adjusted the requisite distance apart and the gage moved to the necessary elevation by inserting liners 37 of proper thickness. The raker teeth may then be filed off to a uniform length and to the same angle.

To gage the raker teeth after they have been swaged, the combined gage and guide bar 45 is removed and reversed to place the stepped gage 48 adjacent to the plate or frame 15, after which the plate is adjusted to the required angle by the set-screws 50. The raker teeth are then gaged, as illustrated in Fig. 8, the point of the swaged tooth being sufficiently depressed to pass over the extended shoulder or step of the gage.

Having thus described my invention, I claim as new and desire to secure by Letters Patent:

1. In a fitting tool for cross-cut saws, a frame, a gage flange projecting from one side of the frame composed of two sections spaced apart, and a pointer gage for the raker teeth of the saw composed of two sections arranged below and between the two sections of the gage flange and adjustable to and from each other to adapt the pointer gage to saw teeth of varying spread.

2. In a fitting tool for cross-cut saws, a frame, a gage flange projecting outwardly from one side of the frame composed of two sections spaced apart, lugs carried by the frame arranged underneath and spaced from the flange sections, a pointer gage for the raker teeth of the saw composed of two sections adjustable to and from each other, each section having a shank, screws threaded through the sections of the gage flange and arranged to clamp the shanks of the pointer gage to the upper faces of the lugs, guide flanges arranged at the same side of the frame below the first mentioned flanges, and a screw carried by the frame and arranged to bear on a jointing file between the two sections of the pointer gage and clamp the said file to the opposite and under faces of the said lugs.

3. In a fitting tool for cross-cut saws, a frame, a pointer gage for the teeth of the saw carried by the frame, composed of two sections adjustable to and from each other and having an opening through which a tooth of the saw is adapted to pass, and a gage flange carried by the frame and arranged to bear on the adjacent teeth of the saw when the raker tooth is inserted in the slot of the pointer gage.

4. In a fitting tool for cross-cut saws, a frame, a gage flange projecting outwardly from one side of the frame, lugs rigid with the frame arranged underneath and spaced from the gage flange, with the under faces thereof inclining upwardly and inwardly, a pointer gage, screws threaded through the gage flange and arranged to clamp the opposite end portions of the pointer gage to the upper faces of the lugs, and a screw adjustable on the frame and arranged to clamp a jointing file to the under inclined faces of the lugs.

5. In a fitting tool for cross-cut saws, a frame, a pointer gage carried by the frame having a slot to receive the raker teeth and constructed of two sections, each of which is provided with an outwardly-extending shank, and one of said sections having a stem extending from its inner end and slidably received in the opposed end of the opposite section.

6. In a fitting tool for cross-cut saws, a frame, a supporting flange projecting outwardly from one side of the frame, a combined guide and gage bar carried on the supporting flange, and set-screws threaded through the supporting flange and arranged to bear on and laterally tilt the combined guide and gage bar.

7. In a fitting tool for cross-cut saws, a frame, a guide bar supported at one side of the frame, a clamping-member adjustable at one side of the frame to and from the bar, and a scriber adapted to be adjustably secured by the clamping-member to the bar.

8. In a fitting tool for cross-cut saws, a frame, a guide bar supported at one side of the frame, a clamping-member adjustable at one side of the frame to and from the bar, and an inwardly-yielding scriber adapted to be adjustably secured by the clamping-member to the bar.

9. In a fitting tool for cross-cut saws, a frame, guide flanges arranged at one side of the frame, each composed of sections spaced apart, a guide-bar arranged at the same side of the frame above the guide flanges, a clamping-member adjustable at the same side of the frame between the sections of the flanges, and binding screws threaded in the frame and opposed to the clamping member.

10. In a fitting tool for cross-cut saws, a bar, an arm fulcrumed on the bar having a limited outward movement therefrom and provided with a scribing edge, a spring normally forcing the bar outwardly, and means to secure the bar in a position to mark the pitch line on the side of the saw teeth.

11. In a fitting tool for cross-cut saws, a frame having guides adapted to bear on the side of the saw, a guide-bar adapted to bear on the teeth of the saw, and a scriber spring-pressed laterally from the frame arranged to mark the pitch line on the side of the teeth of the saw when the teeth are bearing on the guide-bar.

12. In a fitting tool for cross-cut saws, a frame having guides adapted to bear on the side of the saw, a guide-bar adapted to bear on the teeth of the saw, an arm pivotally supported on the frame to swing laterally therefrom and having a scribing edge arranged to mark the pitch line on the side of the teeth of the saw when the teeth are bearing on the guide-bar, and means to vertically adjust the scriber.

In testimony whereof I have signed my name to this specification in the presence of two subscribing witnesses.

CECIL R. PIERCE.

Witnesses:
L. GRANT SCHOTT,
H. B. MCELROY.